United States Patent [19]

Reinauer

[11] Patent Number: 4,566,828
[45] Date of Patent: Jan. 28, 1986

[54] BALL TRACK MILLING CUTTER TOOL

[75] Inventor: Josef Reinauer, Sigmaringen, Fed. Rep. of Germany

[73] Assignee: Gottlieb Guhring, Ebingen, Fed. Rep. of Germany

[21] Appl. No.: 560,828

[22] Filed: Dec. 13, 1983

[30] Foreign Application Priority Data

Dec. 20, 1982 [DE] Fed. Rep. of Germany ....... 3247138

[51] Int. Cl.$^4$ ............................................. B23C 5/22
[52] U.S. Cl. ........................................ 407/48; 407/42; 407/54; 407/62; 407/104; 408/197; 408/713
[58] Field of Search ....................... 407/41, 42, 49, 48, 407/103, 61, 62, 64, 65, 36, 40, 50, 54, 104, 109, 110; 408/713, 197, 238, 239, 240

[56] References Cited

U.S. PATENT DOCUMENTS

| | | | |
|---|---|---|---|
| 2,400,856 | 5/1946 | Thompson | 407/48 |
| 3,341,923 | 9/1967 | Kelm | 407/104 |
| 3,354,526 | 11/1967 | Erkfritz | 407/104 |
| 4,334,446 | 6/1982 | Field | 407/40 |
| 4,355,932 | 10/1982 | Koppelmann et al. | 408/713 |
| 4,423,989 | 1/1984 | Kress et al. | 408/197 |

FOREIGN PATENT DOCUMENTS

| | | | |
|---|---|---|---|
| 2644827 | 4/1978 | Fed. Rep. of Germany | 408/197 |
| 2044012 | 5/1979 | Fed. Rep. of Germany | 408/713 |
| 3001120 | 7/1981 | Fed. Rep. of Germany | . |
| 2082102 | 3/1982 | United Kingdom | 407/36 |

OTHER PUBLICATIONS

Maschinenmarkt, Wurzburg, 3/26/82, p. 403, Article by Hans Cornely and Werner Kimmel.

Primary Examiner—Francis S. Husar
Assistant Examiner—Jerry Kearns

[57] ABSTRACT

A cutting tool is disclosed, particularly a ball track milling cutter, comprising a tool holder in which a turnover cutting disc is received that includes four cutting edges of circular arc segment shape. The cutting disc is received in a slot dividing the tool holder into two clamping jaws and is adapted to be clamped in position by a clamping screw which extends diametrically and passes through the cutting disc in the area of an opening. In addition to the clamping screw a thrust piece is provided to press the cutting disc with two cutting flanks axially against abutment faces at the bottom of the slot. The thrust piece is embodied by a nut extending through the cutting disc and adapted to be threaded into one of the clamping jaws, the nut having an outer conical portion located opposite the opening in the cutting disc throughout the height thereof and adapted to be engaged progressively in firm line contact with an inner surface area of the opening facing the slot bottom, as the nut is being screwed in, at the same time, pressing the turnover cutting disc against abutment faces of the tool holder while engaging the nut, the clamping screw tightens the clamping jaws against the turnover cutting disc.

31 Claims, 4 Drawing Figures

BALL TRACK MILLING CUTTER TOOL

The present invention relates to a cutting tool, in particular a ball track milling cutter, comprising a tool holder and a turnover cutting disc which includes four cutting edges of circular arc segment shape and is adapted to be clamped in a slot dividing the tool holder into two clamping jaws by means of a clamping screw extending diametrically and passing through the cutting disc in the area of an opening, an additional thrust piece being provided to press the cutting disc with two cutting surfaces axially against abutment faces in the area of the bottom of the slot.

A cutting tool of this type is known from DE-PS No. 30 22 104 which has the turnover cutting disc clamped and fixed in axial direction by a T-shaped thrust piece received at the bottom of the slot, guided in a central axial recess of the tool holder, and pressed against the cutting edge segments facing the slot bottom by a taper pin which extends diametrically through the tool holder. In this manner the turnover cutting disc is to be biased axially and thus positioned between the clamping screw and the thrust piece.

This type of fixing of the turnover cutting disc has proved to have certain disadvantages when high cutting duties must be achieved, as it is the case with a ball track milling cutter: The cutting forces acting on a cutting edge of circular arc segment shape have very great force components not only in axial direction but also in a direction normal to the cutting disc and, moreover, in a direction which lies in the plane of the cutting disc and is perpendicular to the axis of the tool holder. With this known cutting tool the axial component of force can be accommodated only by the rather elastic T-shaped thrust piece which can only be given (a relatively weak design) small dimensions. Therefore, in the event of a greater advance of the cutting tool, it may happen that the turnover cutting disc loses its accurate alignment with respect to the axis of the tool holder, and this impairs the operating accuracy of the cutting tool and, in the final analysis, shortens the lifetime of the turnover cutting disc. Furthermore, the elasticity inherent in the T-shaped thrust piece because of its structure causes a certain general inaccuracy in positioning the turnover cutting disc in the tool holder, and this must have to be put up with as the T-shaped thrust piece may become bent or deformed within certain limits before the clamping jaws are tightened. This is due to the fact that the surfaces of contact between the T-shaped thrust piece and the turnover cutting disc are located in different planes at both sides of the toll holder axis and also the inclinations of the free flanks of the cutting disc at both sides of the tool holder axis are opposed. The deformation of the T-shaped thrust piece resulting from the unsymmetrical loading in turn makes it necessary for the taper pin to exert greater force on the T-shaped thrust piece so as to overcome the contact forces between the T-shaped thrust piece and the associated guide faces of the clamping jaws. Thus greater force is required to fix the turnover cutting disc, all the more so as the fixing force to be exerted by the setscrew of the taper pin on the turnover cutting disc is transferable to the cutting disc only through the intermission of many guide surfaces. When great axial positioning forces are generated, this involves increased wear of the clamping and fixing members taking part in the transmission of force so that their functional reliability may suffer.

It is an object of the invention to provide a cutting tool, particularly a ball track milling cutter of the kind specified initially with which the turnover cutting disc can be fixed more safely and easily in the tool holder.

This object is met, in accordance with the invention, in that the thrust piece is embodied by a positioning nut extending through the cutting disc and adapted to be threaded into one of the clamping jaws, said nut having an outer conical portion located opposite the opening throughout the height thereof and adapted to be engaged in line contact with an inner surface area of the opening facing the slot bottom as the nut is being screwed in, while pressing the cutting disc against abutment faces of the tool holder, and in that the clamping screw acts to tighten the clamping jaws by engagement with the nut.

In accordance with the invention the force for the axial and lateral positioning of the turnover cutting disc is introduced in the same area where the clamping force is applied so that the slot bottom itself may be drawn upon as the abutment and support surface of the turnover cutting disc. As this abutment face is extremely rigid, any deformations in the positioning procedure are excluded. Instead, an accurate, statically defined positioning of the turnover cutting disc is obtained as the cutting edges of circular arc segment shape are being pressed against the abutment faces. The thrust piece in the form of a nut which has a conical outer surface portion in line contact with the opening in the turnover cutting disc throughout the entire height thereof permits great axial forces to be transmitted to the turnover cutting disc, at minor actuating forces, without causing any deformation of the thrust piece that might affect the positioning accuracy of the turnover cutting disc. The location of the positioning and clamping means in accordance with the invention at a single place moreover makes it possible to apply tools for tightening the positioning nut and the clamping screw in coaxial relation. This facilitates the handling in inserting or turning over the cutting disc. It provides the further advantage of giving the tool holder increased bending resistance in general because the recess required for the thrust piece is relatively small and located and transferred in an area where the bending torque to be accommodated by the tool holder is diminished.

The positioning or indexing of the turnover cutting disc in circumferential direction may be effected, for instance, by an appropriate configuration or design of the opening in the turnover cutting disc. An alternative solution lies in that the abutment faces of the slot bottom extend in such manner with respect to the axis of the clamping screw that the opening in the cutting disc, which opening has a taper ratio $\alpha$ adapted to that of the outer surface portion, comes to lie offset from the axis of the clamping screw by a p predetermined measure of eccentricity oriented away from the bottom, wherein at least two diametrically opposed positioning grooves which are formed between two cutting edges of circular arc segment shape and are adapted to be engaged functionally by a positioning member of complementary shape in the bottom of the slot, and a central, circular opening in the cutting disc which is supported symmetrically with respect to the axis of the tool holder at tangentially extending abutment faces. This solution has the special advantage of offering simple manufacture of the turnover cutting disc.

If the nut is accessible from the outside of the clamping jaw into which it is adapted to be threaded and has a recess at this side for tool engagement, this construction permits particularly easy handling when exchanging or turning over the cutting disc since tools may be applied simultaneously from both sides to the holder in this embodiment.

If the clamping jaw which supports the head of the clamping screw has a stepped bore, wherein the bore section facing the cutting disc constitutes a centering surface for a nut end portion adjacent the outer conical portion of the nut, an adaptation of the bore of the tool holder to the geometry of the positioning nut is achieved, which warrants proper guidance of the nut at either end of the slot so that bending deformations largely can be excluded and full line contact is maintained between the nut and the turnover cutting disc, even if the axial forces are great.

If the slot in the tool holder is configured such that the abutment faces each are in contact exclusively with the free flanks of the cutting disc, the cutting edges of circular arc segment shape of the turnover cutting disc will be well preserved and consequently the reliability of the cutting tool, usually of brittle nature, will not be impaired, not even at maximum axial forces.

If the configuration of the slot bottom is such that the abutment faces, as seen in a normal section through the center of the cutting disc, include an angle $\beta$ with the plane of the slot which angle corresponds to the free flank angle of the cutting edges of circular arc segment shape, enables very careful transmission of force from the turnover cutting disc to the tool holder and has the additional advantage of being easy to be manufactured.

An internal hexagonal shape of the nut and clamping screw permits safe operation of the clamping and positioning means, and the cutting performance is not influenced negatively by this configuration.

The invention will be described further, by way of example, with reference to the accompanying drawings, in which.

Figure 1:
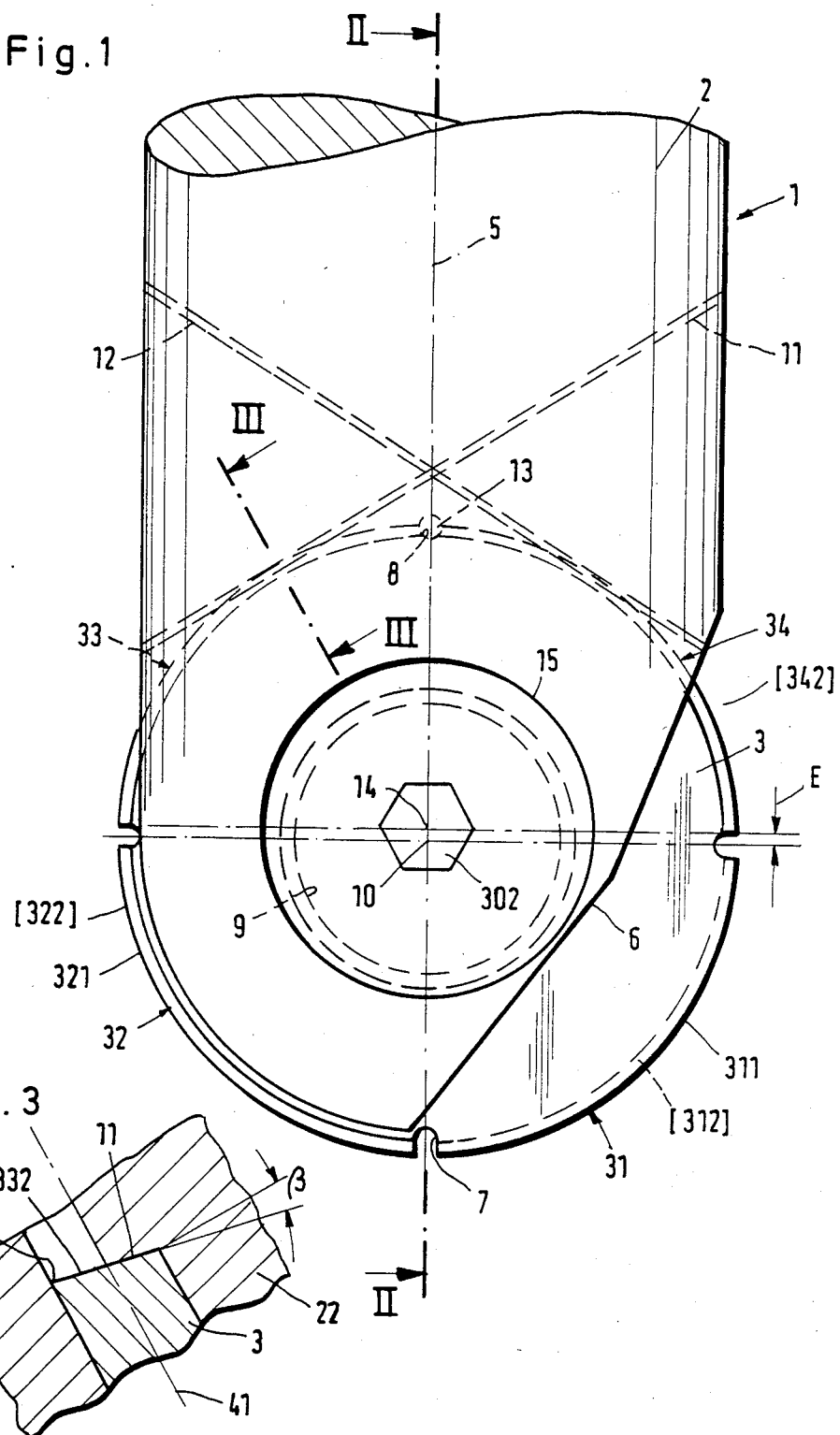
FIG. 1 is a top plan view of the tip of the ball track milling cutter with a turnover cutting disc inserted in position.

FIG. 1 is a top elevational view of a milling tool as used especially in cutting ball track grooves, for instance of a homokinetic joint. Such milling cutters are used when the ball track grooves are to be cut in one stroke, i.e. without feed motion. With this type of machining extreme cutting performance or duties is demanded of the tool and, therefore, hard or cutting metal cutting discs must be employed. The service life of the tool can be prolonged by using turnover cutting discs which may be turned over once through 180°.

In FIG. 1 only the front part of the ball track milling cutter 1 is shown which comprises a tool holder or cutting disc holder 2 for clamping the tool in the machine and a turnover cutting disc 3. The cutting disc 3 has four cutting edges 31 to 34 of circular arc segment shape to cut the ball track grooves, each cutting edge extending through an angular range of about 90°. The respective cutting edges 31 and 32 facing the tip of the tool 1 are in engagement with the workpiece to be cut. It may be taken from the presentation in FIGS. 2 and 3 that the turnover cutting disc 3 is a plate with parallel faces which is received in a corresponding axial slot 4 formed in the tool holder 2. The axial slot 4 divides the tip of the tool holder 2 into two clamping jaws 21 and 22 between which the turnover cutting disc 3 is clamped or tightened. Yet the turnover cutting disc is clamped not only between the clamping jaws 21 and 22 but also fixed in axial direction by a separate fixing and adjustment means, to be described in greater detail below. In this manner even the action of strong cutting forces will not cause the position of the cutting disc 3 to change with respect to the tool holder 2.

If a ball track groove is to be cut, the tool holder 2 is rotated about its axis 5 which is so inclined in the plane of the ball track groove to be cut that it does not intersect the axis about which relative motion between the workpiece and the milling tool takes place in cutting the groove. Therefore, when rotating the milling tool or rather the tool holder 2, the cutting edges 31 and 32 will enter or dive consecutively into the workpiece, each removing a chip substantially of the length of the cutting edge. For better chip discharge the respective clamping jaw adjacent the cutting edge 311 or 321 includes chip discharge chamfer 6, as shown at the right side in FIG. 1.

As already mentioned, the turnover cutting disc 3 which is circular for the cutting of ball track grooves is clamped not only between the clamping jaws 21 and 22 but also must be positioned in axial and circumferential directions. The clamping means and the fixing or adjustment means of the turnover cutting disc 3 now will be described in greater detail.

Figure 2:
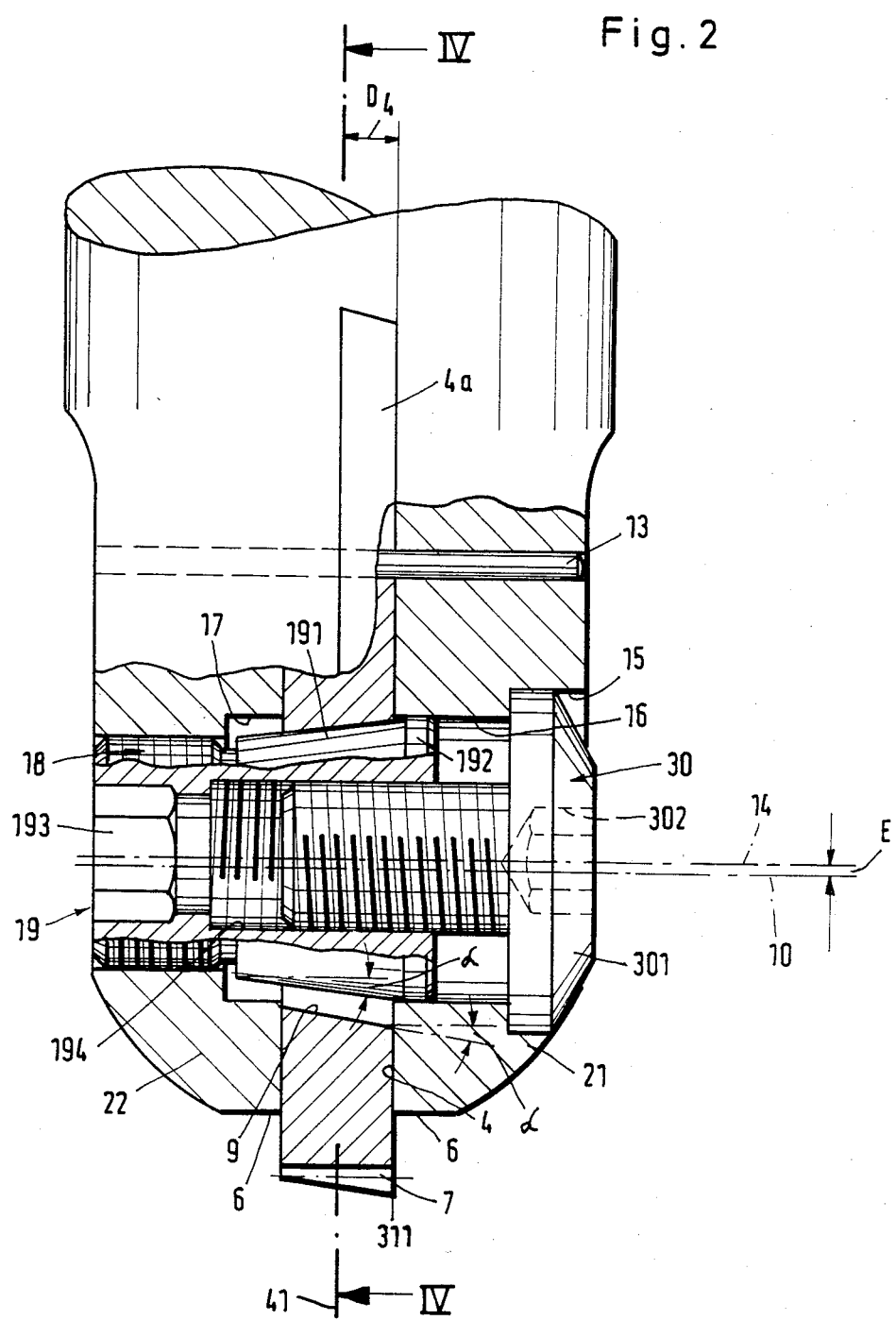
FIG. 2 is a sectional elevation of the ball track milling cutter shown in FIG. 1, along lines II—II of FIG. 1.

The cutting disc 3 has an opening 9 which is concentric with the central axis 10 and defined by a conical shell surface. The cone angle of the opening is designated $\alpha$ in FIG. 2. The turnover cutting disc 3 is supported at the bottom of the slot 4, symmetrically with respect to the central axis 5, along abutment faces 11 and 12, respectively, which are in line contact with the respective free flanks or faces 332 and 342. This line contact may be seen in FIG. 3. The line contact in the area of the free faces may be safeguarded in simple manner by making the slot 4 in the tool holder 2 in the form of two keyway slots 4a and 4b, one on top of the other, and each having a minimum thickness D4 which corresponds to half the thickness of the turnover cutting disc 3. FIG. 2 shows the keyway slot 4a. With the embodiment of FIGS. 1 to 3 the two slots 4a and 4b are contiguous in the central plane 41 of the slot, and the bottom of the slot 4 is defined by the abutment faces 11 and 12. In the embodiments shown these abutment faces are planar surfaces. Yet they may also be curved surfaces such as resulting from the cutting of the partial slots 4a and 4b by a disc milling cutter each of great radius being sunk only once into the tool holder 2.

The Hertizian pressure per unit area between the free faces or flanks of the turnover cutting disc and the abutment faces may be reduced by the design described above of the abutment faces 11 and 12.

Figure 3:
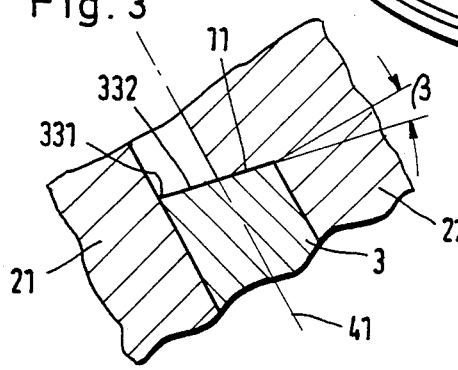
FIG. 3 is a part sectional elevation along lines III—III of FIG. 1.

As may be taken from the presentation of FIG. 3, the abutment faces 11 and 12 are inclined at an angle $\beta$ with respect to the central plane 41 of the slot and consequently also with respect to the parallel faces of the turnover cutting disc 3. This angle corresponds to that of the free faces or flanks 332, 342, 312, and 322. The line contact thus established between the turnover cutting disc 3 and the abutment faces 11 and 12 of the tool holder does not extend as far as to the cutting edges 331 and 341.

Figure 4:
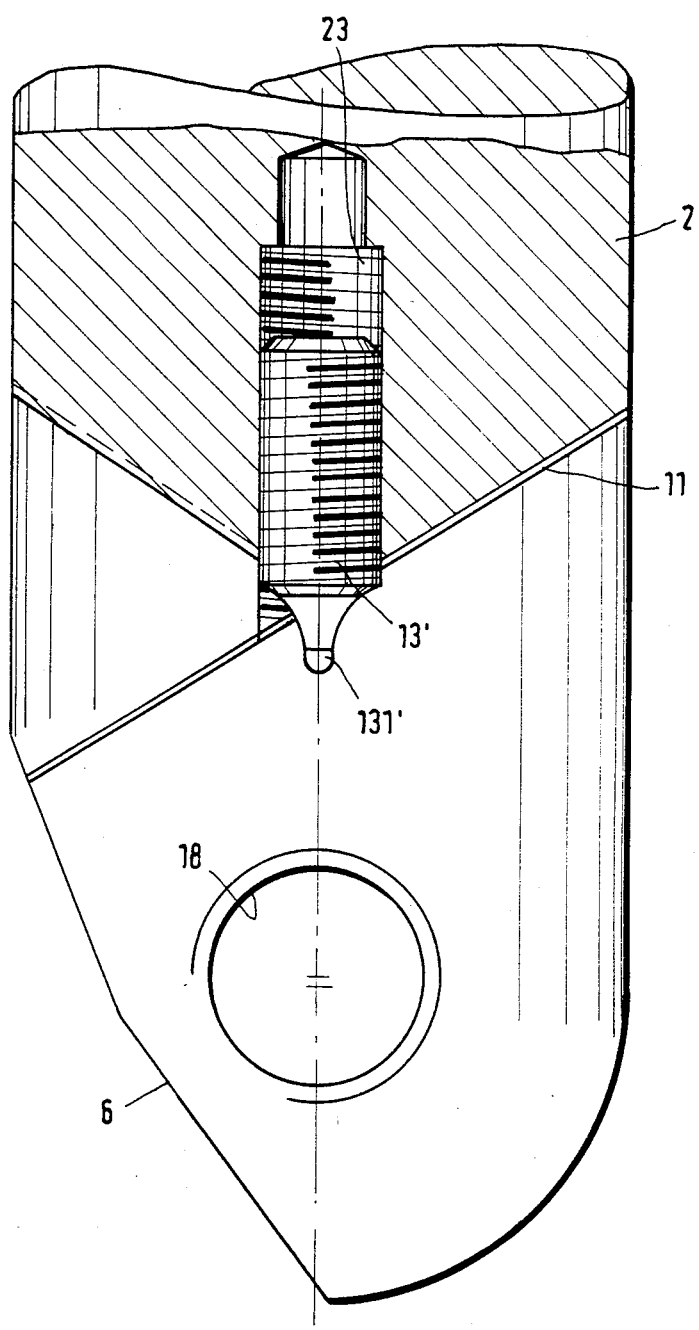
FIG. 4 is a sectional elevation of another embodiment of the milling tool along lines IV—IV of FIG. 2.

It is only in the frontmost area of the tool holder 2 where both partial slots 4a and 4b overlap that a slot is formed of a width which corresponds to the height of the turnover cutting disc 3. Of course the partial slots 4a and 4b could be given a width which is greater than half the thickness of the turnover cutting disc 3. This variant is illustrated in FIG. 4 where it can be seen that the upper partial slot constituting the abutment face 12 extends into the lower clamping jaw 22 (see left side of FIG. 4).

Between adjacent cutting edges each, 31 and 32 as well as 33 and 34, of circular arc segment shape the turnover cutting disc 3 is formed with a positioning groove 7 adapted to enter into functional engagement with a positioning or functioning member 13 at the slot bottom. In the embodiment shown in FIGS. 1 and 2 the positioning member 13 is embodied by a cylindrical pin passing diametrically through the tool holder 2 at such location that it may engage the positioning groove 7 with clearance when the free faces of the turnover cutting disc 3 rest against the abutment faces 11 and 12, respectively. The cylindrical pin 13 intersects the central axis 5 of the tool holder 2. It is obvious that by turning the turnover cutting disc 3 through 180° those cutting edges 33 and 34 which face the slot bottom in the presentation of FIG. 1 will take the positions of the cutting edges 31 and 32 in the assembled state shown.

The cutting tool comprises a screw and nut combination extending through the opening 9 to press the two clamping jaws 21 and 22 against the parallel faces of the turnover cutting disc 3. This screw and nut combination has an axis 14 which intersects the central axis 5 of the tool holder 5, as does the axis 10 of the opening 9. The location of the axis 14 is harmonized with respect to the course of the abutment faces 11 and 12 and the diameter of the turnover cutting disc 3 such that the axes 14 and 10 extend offset with respect to each other in axial direction by a predetermined measure of eccentricity E when the turnover cutting disc 3 is positioned properly. The axis 14 of the screw and nut combination is closer to the bottom of the slot than the axis 10 of the opening 9. The reason for this particular geometric adaptation will be described below.

The tool holder 2 has a stepped bore with respect to the axis 14, including bore portions 15 to 17. This stepped bore extends through both clamping jaws 21 and 22 and passes over into a threaded bore 18 in the area of the clamping jaw 22. The diameters of the bore portions 15 to 18 diminish gradually toward the threaded portion. A positioning nut 19 is screwed into the threaded bore 18. This nut has an outer conical portion 191 and an adjacent cylindrical guiding end portion 192 received with close tolerance in bore portion 16. The positioning nut 19 is formed at its other end, radially inside the outer thread, with an internal hexagonal recess 193. The positioning nut 19 further includes an internal thread 194 adapted to enter into functional engagement with a clamping screw 30. The clamping screw 30 has a screw head 301 which is guided in bore portion 15 and rests on the first shoulder formed between bore portions 15 and 16. An internal hexagonal recess 302 is formed in the head of the clamping screw 30.

The diameter of bore portion 16 is so selected that the conical shell surface of the opening 9 protrudes slightly beyond the edge of this bore portion at the side facing the bottom of the slot. The outer conical portion 191 of the nut 19 has a cone angle α which corresponds to the cone angle of the opening 9. It may be taken from the presentation of FIG. 2 that the outer conical portion 191 is in line contact with the conical shell surface of the opening 9 throughout the length or height thereof, thus preventing any axial movement of the turnover cutting disc 3 out of the slot 4. The tightening of the clamping jaws 21 and 22 by the clamping screw 30 is effected by engagement with the positioning nut 19.

The assembly procedure of the turnover cutting disc 3 in the tool holder 2 will be described below.

First, the turnover cutting disc 3 is introduced into the slot 4 such that the positioning groove 7 and a cylindrical pin 13 will enter into clearance contact. In this condition the turnover cutting disc 3 can be moved with clearance in slot 4 so that it is easily pressed by hand against the bottom of the slot, i.e. against the abutment faces 11 and 12. Yet care must be taken that the turnover cutting disc 3 is inserted in the slot such that the cone of the opening 9 will open in a direction away from the threaded bore 18. As soon as the turnover cutting disc 3 has been moved into the position described above, the positioning nut 19 may be inserted through bore portions 15 to 17 and threaded into the clamping jaw 22 by means of a suitable wrench for socket head cap screw or any other socket wrench in cooperation with the internal hexagonal recess 193. As the nut 19 is being screwed in, the outer conical portion 191 gradually enters into line contact with the conical shell surface of the opening 9 whereby the turnover cutting disc 3 will be pressed with increasing force against the abutment faces 11 and 12. It should be stressed in this context that the introduction of force in the plane of symmetry of the turnover cutting disc 3 and also the support on the abutment faces 11 and 12 is realized symmetrically with respect to the central axis 5 of the tool holder 2. By virtue of the special configuration described above of the slot bottom, i.e. the partial slots 4a and 4b located on top of each other, the cutting edges 311, 321, 331, and 341 remain entirely unloaded during this pressing. This is so even if the cone angle α is very small. In this manner even self-locking touching contact may be aimed at between the outer conical portion 191 and the opening 9. It is also important that in being threaded in, the nut 19 is guided by the threaded bore 18, on the one hand, and, on the other hand, in the bore portion 16, i.e. at either end of the outer conical portion 191. This will largely exclude any deformations. When the nut 19 has been tigthened sufficiently in the clamping jaw 22, the clamping screw 30 is threaded into the nut 19 whereby both clamping jaws can be pressed against the turnover cutting disc 3, with the screw head 301 abutting against the clamping jaw 21. As the clamping screw 30 is tightened, again by using a wrench for socket head cap screws, the tool may be left in the internal hexagonal recess 193 of the nut 19 so that the latter may be tightened further, if desired, while the clamping screw 30 is being fastened by threading.

It is important for the proper functioning of the milling tool described above that the depth of bore portion 17 is sufficient to prevent the outer conical portion 191 from abutting against the step in the bore formed between bore portion 17 and threaded bore 18, as the nut 19 is being threaded in. In a modification of the embodiment shown in FIGS. 1 and 2 the bore portion 17 may be so designed that it cooperates with a cylindrical guide surface of the nut provided between the outer conical portion 191 and the threaded bore 18, in a manner similar to bore portion 16.

FIG. 4 shows another embodiment of the ball track milling cutter. This figure is only an axial sectional elevation of the tool holder, the turnover cutting disc 5 being omitted for reasons of clarity of the drawing. The embodiment illustrated in FIG. 4 differs from the one according to FIGS. 1 to 3 in that, on the one hand, the partial slots are wider than half the thickness of the turnover cutting disc. Another difference resides in the fact that the positioning cylindrical pin 13 is replaced by another positioning member 13'. This positioning member 13' is an adjustment pin received in an axial central threaded bore 23 of the tool holder 2. The adjustment pin has a concentric hemispherical nose projection 131' adapted for engagement with the positioning grooves 7 in the turnover cutting disc 3. The embodiment shown in FIG. 4 has the special advantage of providing for closer adjustment of the clearance between the positioning grooves and the positioning member.

The invention thus provides a cutting tool, particularly a ball track milling cutter which comprises a tool holder comprising a turnover cutting disc formed with four cutting edges of circular arc segment shape. The turnover cutting disc is received in a slot dividing the tool holder into two clamping jaws, and it is adapted to be clamped in the slot by a clamping screw extending diametrically and passing through the turnover cutting disc in the area of the opening formed in the same. In addition to the clamping screw a thrust piece is provided to press the turnover cutting disc with two of its cutting surfaces or flanks axially against abutment faces at the bottom of the slot. The thrust piece is embodied by a nut extending through the turnover cutting disc and adapted to be threaded into one of the clamping jaws. This nut has an outer conical portion opposing the opening in the turnover cutting disc throughout the height thereof. This outer conical portion is designed such that it enters progressively into firm line contact with the inner surface area of the opening facing the slot bottom, thereby tightening of the nut and simultaneously pressing the turnover cutting disc against the abutment faces of the tool holder takes place. The clamping screw acts to tighten the clamping jaws against the turnover cutting disc by engagement with, i.e. via the nut.

Various modifications in structure and or function may be made to the disclosed embodiments by one skilled in the art without departing from the scope of the invention as defined by the claims.

What is claimed is:

1. A cutting tool for milling grooves of semicircular cross-section comprising:
   a holder having at one end a slot forming cooperative first and second clamping jaws, an indexable cutting disc clamped between the first and second jaws, the cutting disc having cutting edges and adjacent flank faces and the slot having abutment surfaces for supporting the cutting disc within the slot such that the flank faces of the cutting disc abut against the abutment surfaces in the slot;
   an opening in the holder passing through the first and second clamping jaws and an opening in the cutting disc having an inner conic surface; the opening of the first jaw being smaller than the opening of the second jaw and the opening of the first jaw having an internal thread;
   a positioning nut extending into and through the second jaw opening and protruding through the disc opening and having a thread at one end thereof engaging with the internal thread of the first jaw opening, the positioning nut having an outer surface forming a sloping conic surface entirely in contact engagement with the inner conic surface of the disc opening, the conic surfaces of the disc opening and the nut being complementary; the positioning nut having an internal thread at another end thereof;
   a clamping screw extending into the second jaw opening and into the disc opening, the screw having a threaded portion which engages with the internal thread of the positioning nut to tighten the first and second jaws on the cutting disc and urge the disc against the slot abutment surfaces.

2. The cutting tool according to claim 1 wherein the abutment surfaces are inclined to an axis of the clamping screw and tangentially engage the periphery of the cutting disc;
   the cutting disc opening having an axis offset from the axis of the clamping screw, the offset being in a direction away from the bottom of the slot.

3. The cutting tool according to claims 1 or 2 wherein the positioning nut has a recess which can be engaged exteriorly of the clamping jaws.

4. The cutting tool according to claims 1 or 2 wherein the holder opening comprises a plurality of stepped bore sections, the stepped bore section immediately adjacent the cutting disc forming a centering guide surface for an end portion of the positioning nut.

5. The cutting tool according to claim 2 wherein the flank faces of the disc are inclined at an angle substantially equal to the angle of inclination of the abutment surfaces.

6. The cutting tool according to any one of claims 1 or 2 or 5 comprising a positioning groove in the periphery of the cutting disc, and
   a cylindrical pin extending thorugh the holder and positioned in the groove.

7. The cutting tool according to any one of claims 1 or 2 or 5 comprising a positioning groove in the periphery of the cutting disc, and
   an adjustment pin threaded into a bore in the holder, the pin having a projection which is positioned in the groove.

8. The cutting tool according to any one of claims 1 or 2 or 5 wherein the positioning nut outer conic surface is at an angle of approximately 6°.

9. The cutting tool according to any one of claims 1 or 2 or 5 wherein the clamping screw and the positioning nut each have a hexagonal recess which can be engaged exteriorly of the clamping jaws.

10. The cutting tool according to any one of claims 2 or 5 wherein the axis offset is approximately 0.3 mm.

11. The cutting tool according to claim 3 wherein the second jaw supports a head of the second screw, the clamping jaw has a section of a stepped bore facing the cutting disc forming a centering surface for a nut end portion adjacent the outer conic surface of the nut.

12. The cutting tool according to claim 3 wherein a cylindrical pin extending through the holder engages a groove in the periphery of the cutting disc.

13. The cutting tool according to claim 4 wherein a cylindrical pin extending through the holder engages a groove in the periphery of the cutting disc.

14. The cutting tool according to claim 3 wherein an adjustment pin which is threaded into a bore in the disc holder has a projection engaging a groove in the periphery of the cutting disc.

15. The cutting tool according to claim 4 wherein an adjustment pin which is threaded into a bore in the disc holder has a projection engaging a groove in the periphery of the cutting disc.

16. The cutting tool according to claim 3 wherein the positioning nut outer conic surface is approximately 6°.

17. The cutting tool according to claim 4 wherein the positioning nut outer conic surface is approximately 6°.

18. The cutting tool according to claim 6 wherein the positioning nut outer conic surface is approximately 6°.

19. The cutting tool according to claim 7 wherein the positioning nut outer conic surface is approximately 6°.

20. The cutting tool according to claim 3 wherein the clamping screw has an internal hexagonal recess and the nut has an internal hexagonal recess, each recess being accessible exteriorly of the clamping jaws.

21. The cutting tool according to claim 4 wherein the clamping screw has an internal hexagonal recess and the nut has an internal hexagonal recess, each recess being accessible exteriorly of the clamping jaws.

22. The cutting tool according to claim 6 wherein the clamping screw has an internal hexagonal recess and the nut has an internal hexagonal recess, each recess being accessible exteriorly of the clamping jaws.

23. The cutting tool according to claim 7 wherein the clamping screw has an internal hexagonal recess and the nut has an internal hexagonal recess, each recess being accessible exteriorly of the clamping jaws.

24. The cutting tool according to claim 8 wherein the clamping screw has an internal hexagonal recess and the nut has an internal hexagonal recess, each recess being accessible exteriorly of the clamping jaws.

25. The cutting tool according to claim 3 wherein the axis offset is approximately 0.3 mm.

26. The cutting tool according to claim 4 wherein the axis offset is approximately 0.3 mm.

27. The cutting tool according to claim 6 wherein the axis offset is approximately 0.3 mm.

28. The cutting tool according to claim 7 wherein the axis offset is approximately 0.3 mm.

29. The cutting tool according to claim 8 wherein the axis offset is approximately 0.3 mm.

30. The cutting tool according to claim 9 wherein the axis offset is approximately 0.3 mm.

31. A cutting tool according to claim 1 wherein the disc opening passes through the disc and the inner conic surface is coextensive with the disc opening.

* * * * *